United States Patent [19]
Kinkelin et al.

[11] Patent Number: 5,767,226
[45] Date of Patent: Jun. 16, 1998

[54] COPOLYETHER ESTER HOT-MELT MASSES

[75] Inventors: Eberhard Kinkelin, Chur; Gerhard Poessnecker, Trin; Jürgen Spindler, Domat/Ems, all of Switzerland

[73] Assignee: EMS-Inventa AG, Zurich, Switzerland

[21] Appl. No.: 909,586

[22] Filed: Aug. 12, 1997

[30] Foreign Application Priority Data

Aug. 12, 1996 [DE] Germany ............... 196 32 474.2

[51] Int. Cl.$^6$ .................................................. C08G 63/16
[52] U.S. Cl. ........................ 528/300; 528/301; 528/308; 528/308.6
[58] Field of Search .......................... 528/300, 301, 528/308, 308.6

[56] References Cited

U.S. PATENT DOCUMENTS

| | | |
|---|---|---|
| 4,116,925 | 9/1978 | Brachman et al. . |
| 4,156,774 | 5/1979 | Buxbaum et al. . |
| 4,335,188 | 6/1982 | Igi et al. ............................ 428/458 |
| 4,436,896 | 3/1984 | Okamoto et al. .................. 156/332 |
| 4,452,853 | 6/1984 | Schade et al. . |
| 4,725,483 | 2/1988 | Ishii et al. . |
| 4,820,769 | 4/1989 | Gaku et al. ......................... 525/113 |
| 4,871,811 | 10/1989 | Gaku et al. ......................... 525/148 |
| 4,975,477 | 12/1990 | Cox et al. ............................ 524/77 |
| 4,985,535 | 1/1991 | Takada et al. ....................... 528/272 |

FOREIGN PATENT DOCUMENTS 0 072 433  12/1984  European Pat. Off. .
204 528    12/1986  European Pat. Off. .

OTHER PUBLICATIONS

Patent Abstract of JP 54/153835—Toray Ind Inc, May 23, 1978.

Patent Abstract of JP 58134114–Aug. 1983.

Patent Abstract of JP 57108177–Jul. 1982.

Patent Abstract of JP 59011383–Jan. 1984.

*Primary Examiner*—Samuel A. Acquah
*Attorney, Agent, or Firm*—Hardaway Law Firm, P.A.

[57] ABSTRACT

The invention relates to novel hot-melt masses consisting of a statistically built-up copolyether ester based on terephthalic acid in a mixture of aliphatic diols. Terephthalic acid is used as the single acid component and its molar amount, relative to the total amount of acid, is 100 molar %. A combination of butane diol, triethylene glycol and polyethylene glycol is present as diol component. The molar amount of butane diol is less than 80 molar %, the amount of triethylene glycol is between 15 and 60 molar % and at least 2 and at the most 10 molar % of a higher-molecular polyethylene glycol component with a molar mass of 600–4000 g/mole is used, relative to the total acid amount and total diol amount of 100 molar % in each instance. The melting point of the copolyether ester adhesive masses is between 90° and 180° C. The copolyetherester hot-melt masses can be used in the hot-melt method and for other known powder coating methods.

11 Claims, No Drawings

COPOLYETHER ESTER HOT-MELT MASSES

The invention relates to thermoplastic copolyether esters for hot-melt applications.

The invention is concerned in particular with linear or branched fast-crystallizing and highly flexible copolyether esters based on terephthalic acid, 1,4-butane diol, triethylene glycol and a polyethylene glycol with an average molecular weight of 600–4000 g/mole. These polyether esters function as hot-melt masses for industrial and textile applications.

The use of various copolyesters and copolyether esters has already been frequently described in the literature.

EP-A-0,204,528 describes copolyester foils for foodstuff packagings consisting of a copolyester with at least 85 molar % terephthalic acid (TPA), 65 to 97 molar % butane diol (BDO) and 3 to 35 molar % of a polyethylene glycol (PEG) with a molar mass between 106 and 550 g/mole. The melting point of these products is between 160° and 200° C. Hot-melt adhesives with such high melting points can not be used in the textile industry.

DE-A-31 32 059 describes a polyether ester system for the bonding of textiles consisting of terephthalic acid (TPA), isophthalic acid (IPA), butane diol and 10–25% of a polyalkylene ether diol with a molar mass of 400–600 g/mole and with a melting point of 95°–125° C.

Even JP 54/153835 describes a hot-melt adhesive for fibers of TPA, IPA, butane diol and 1–10% polyalkylene glycol with a molecular weight of 300–6000 g/mole. IPA, which distinctly worsens the crystallization properties, is used in these two documents to lower the melting point.

A thermoplastic mixed polyester is described in DE-A-28 29 375 which consists of TPA, another acid, 15–30 molar % ethylene glycol, diethylene glycol and 0.5.5 molar % polybutylene glycol. A certain amount of ethylene glycol and especially polybutylene glycol are explicitly required here.

DE-A-44 30 048 describes a copolyester of TPA, IPA, butane diol and a mixture of diethylene glycol and triethylene glycol; the melting point here is between 60° C. and 130° C.

Finally, DE-A-27 25 709 describes thermoplastic block copolymers of TPA, butane diol and 1–7%, relative to PBT, polyether with a molecular weight of 600–6000 g/mole. In this patent special polymer blocks are used in contrast to the statistic distribution.

EP-A-0,164,910 describes copolyester foils and hot-melt masses contained in these foils. The copolyester hot-melt adhesives have as components 80 to 97 molar % terephthalic acid and 3 to 20 molar % isophthalic acid and as diol component 60 to 85 molar % 1,4-butane diol and 15 to 40 molar % diethylene glycol. The melting point of these copolyesters is in a range of 160° to 200° C.

All these above-mentioned patents have significant substantial disadvantages and do not result in thermoplastic copolyether ester hot-melt masses with a high crystallization rate and high flexibility which can be used as hot-melt adhesives in industrial applications for difficult substrates.

The present invention had the goal of developing relatively low-melting, fast-crystallizing and highly flexible products for hot-melt adhesive applications.

The advantage of a low melting point resides in particular in the possibility of being able to use lower application temperatures. This is particularly important in the area of industrial bondings when substrates such as, e.g., certain plastics are used which have melting temperatures below 150° C.

The use of a copolyester with high crystallization rate presents itself for various reasons. The formation of crystalline areas is a precondition for the mechanical strength of a polymer above the glass temperature. Thus, the more rapidly these crystalline domains can be formed, the sooner the bonding site can be mechanically stressed. Moreover, the surface adhesiveness of a polymeric hot-melt adhesive is a direct function of its crystallization. The lesser the tendency toward crystallization the longer e.g. coated foils remain tacky. This entails problems e.g. when rolling up these foils since the individual layers can readily adhere to each other, which renders the entire roll unusable. This effect can be circumvented by applying a so-called carrier foil which separates the applied carrier from the next layer. However, this foil must be removed before pressing with the further substrate, which results in increased expense and in particular in waste. Another possibility is constituted by tempering procedures, which are time- and energy intensive and are naturally likewise a significant disadvantage for the entire production process. All these are eliminated when a fast-crystallizing polymer is used.

The advantage of highly flexible products is obvious in many respects. On the one hand, in the case of bondings in the industrial area, dependent on the substrate, sufficient adhesion values and resistances can only be achieved with flexible adhesive masses.

On the other hand, coated and adhered parts can still be exposed subsequently to tensions and deformations in the case of which traditional adhesives lose their adhesive properties and result in substrate separations. In these instances a highly flexible adhesive is the sole possibility of achieving a permanent union of materials.

The invention therefore has the problem of reconciling by means of a suitable combination of raw materials the three required properties of "relatively low melting point", "high crystallization rate" and "high flexibility" and of making available novel hot-melt adhesive masses consisting of a statistically constructed copolyether ester based on terephthalic acid and a mixture of aliphatic diols.

This problem is solved by the fast-crystallizing and highly flexible copolyether ester hot-melt adhesive masses in accordance with claim 1. Claims 6 and 7 indicate special applications of the hot-melt adhesive masses in accordance with the invention.

The subclaims contain special embodiments of the invention.

The solution of the above-named problem is to be found especially in hot-melt adhesive masses consisting of statistically composed copolyether esters with a combination of butane diol (BDO), triethylene glycol (TEG) and polyethylene glycol (PEG) and, selectively, other linear or branched aliphatic diols and terephthalic acid (TPA) as the sole acid component. The viscosity should preferably be above 200 Pa.s at 160° C. in these highly flexible products.

If only terephthalic acid is used as acid component the melting points are in general far above the desired range. A reduction of the melting point is possible by partially replacing the terephthalic acid with another acid such as e.g. isophthalic acid (IPA). However, such a combination worsens the crystallinity and the crystallization rate to a considerable extent.

Surprisingly, the melting point can be lowered by over 80° C. in the present invention by using triethylene glycol as codiol component while retaining at the same time the high crystallization rate.

Although a certain flexibility of the polymer is achieved already by the use of low-molecular ether diols, the goal of producing a highly flexible polymer can be achieved only by the simultaneous use of a higher-molecular ether diol such as e.g. polyethylene glycol 600.

Although there is a large number of patents in the area of adhesives, the monomer combination of the present patent has not yet been described and is unique in its combination and in the properties achieved.

Thus, EP-A-204,528 does describe a copolyester film consisting of 85-100% TPA, 65-97% butane diol and 3-35% molar % polyethylene glycol with a molecular weight of 106-550 g/mole and with a melting point of 160°-200° C. In comparison to the present invention the absolutely necessary triethylene glycol component is lacking here and also, the molecular weight range of the polyethylene glycol does not include the polyethylene glycol in accordance with the invention and the melting range is too high on account of the application for adhesive films.

Only terephthalic acid is used as acid component for the copolyether ester hot-melt masses of the invention. The molar amount of butane diol is between 45 and 70 molar % relative to the entire amount of diol whereas the amount of triethylene glycol is between 20 and 50 molar %. A polyethylene glycol with a molar mass of 600-4000 g/mole in the amount of 2-10 molar % is used as higher-molecular polyethylene glycol component. The amount of butane diol can be reduced by up to 3 molar % if a polyvalent alcohol component such as e.g. trimethylolpropane or, optionally, also a β-hydroxyalkyl amide is used to raise the molecular weight of the polymer. The molar percentages stated above refer to the amount of units derived from each component in the product polymer, and are based on the total amount of acid or diol units in the product polymer.

The melting points of the copolyether ester hot-melt masses of the invention are between 90° and 180° C., preferably between 110° and 170° C. The melting viscosity, measured at 160° C. and 2.16 kg load according to DIN/ISO 1133, is not below 200 Pa.s, preferably not below 500 Pa.s.

The advantages of the invention are based on the special action, not described anywhere, of the combination of TPA, butane diol, triethylene glycol and higher-molecular polyethylene glycol which on the one hand shifts the melting point into the desired range and on the other hand is also responsible for the high crystallization rate and especially for the extremely high flexibility.

The copolyether ester hot-melt masses of the invention are primarily used in the hot-melt process on account of their flexibility but can also be used in known powder coating processes.

The following examples are intended to compare the copolyether esters of the invention to other products. Examples 9-11 are reference examples which are not covered by the present invention.

The melting points, glass temperatures and cold crystallization points were carried out with a DSC device of the DuPont company, type 1090B. The maximum of the melting peak is taken as melting point and the middle of the two baselines as glass temperature. The maximum of the crystallization peak during the second heating of the specimen in the DSC is the valid cold crystallization point.

The melting viscosity was determined according to the outflow method at 160° C. and a load of 2.16 kg according to DIN/ISO 1133.

EXAMPLE 1

1.15 kg (1.27 moles) butane diol, 1.45 kg (0.97 mole) triethylene glycol and 0.82 kg (0.14 mole) polyethylene glycol with an average molecular weight of 600 are placed in a 10 l esterification reactor provided with temperature sensor, agitator, reflux column and distillation bridge and melted at 140° C. under an atmosphere of nitrogen maintained during the entire reaction. 2.82 kg (1.27 moles) terephthalic acid and 3 g esterification catalyst are then added under agitation. After a gradual raising of the inner temperature to 235° C. the reaction is continued until no more distillate is produced. Then, 6 g esterification catalyst are added again as well as 3 g thermal stabilizer. The temperature is raised to 250° C. and a gradual vacuum applied until an ultimate [maximum] vacuum of <1 mbar is achieved. The condensation is continued for at least 2 hours until the desired viscosity is achieved.

After having been dried 24 hours at 60° C., the polyester obtained has a melting point of approximately 128° C., a TG of approximately −5° C. and a melting viscosity of 1100 Pa*s, measured at 160° C. and 2.16 kg load.

EXAMPLES 2-11

Polyesters were produced in analogy with example 1 and are collated in tables 1 and 2.

The DSC measurements were carried out on pre-dried material (24 h/70° C.).

The molar percentages cited in Tables 1 and 2 refer to the amount of units derived from each component in the product polymer and are based on the total amount of acid or diol units in the product polymer.

TABLE 1

|  | 1 | 2 | 3 | 4 | 5 | 6 |
|---|---|---|---|---|---|---|
| Terephthalic acid (molar %) | 100 | 100 | 100 | 100 | 100 | 100 |
| Butane diol (molar %) | 52 | 66 | 59 | 49 | 58 | 56 |
| Triethylene glycol (molar %) | 40 | 26 | 33 | 43 | 40 | 40 |
| Polyethylene glycol 600 (molar %) | 8 | 8 | 8 | 8 | 2 | 4 |
| Melting point (DSC, °C.) | 128 | 160 | 145 | 112 | 138 | 133 |
| Glass Temperature (DSC, °C.) | −5 | −3 | −5 | −6 | 7 | 4 |
| Cold crystallization point (DSC, °C.) | 44 | 22 | 26 | 45 | 47 | 50 |
| Melting viscosity 160° C., (Pa · s) | 1100 | 150* | 2000 | 1050 | 1200 | 1150 |

*measured at 190° C./2.16 kg

TABLE 2

|  | 7 | 8 | 9 | 10 | 11 |
|---|---|---|---|---|---|
| Terephthalic acid (molar %) | 100 | 100 | 100 | 100 | 100 |
| Butane diol (molar %) | 54 | 50 | 92 | 59 | 54 |
| Triethylene glycol (molar %) | 40 | 40 |  | 41 | 46 |
| Polyethylene glycol 600 (molar %) | 6 | 10 | 8 |  |  |
| Melting point (DSC, °C.) | 133 | 120 | 209 | 136 | 121 |
| Glass Temperature (DSC, °C.) | −2 | −8 |  | 17 | 12 |
| Cold crystallization point (DSC, °C.) | 30 | 43' | 50 | 69 | 64 |
| Melting viscosity 160° C., (Pa · s) | 1100 | 900 | 100* | 1170 | 1120 |

*measured at 230° C./2.16 kg

EXAMPLES 12-14

Coating tests for determining the original adhesion and the thermal resistance were carried out on the copolyether ester of examples 1, 3, 10 and 11.

In order to test the adhesive strength on textiles powders with a grain size of 80 to 200 μm were applied onto a commercial stiffening cloth [interlining material] by means of scatter coating and a coating weight of 40 g/m² and this cloth subsequently pressed with a pressing pressure of 0.4 bar with a commercial upper material.

In order to measure the adhesive force on textiles adhered textile strips 5 cm wide were fixed in a traction machine. The testing parameters were constant for all measurements:

Test speed: 100 mm/min

Test body width: 500 mm

Test stretch: 80 mm

Prestress: 0N

Test temperature: 25° C.

Pressing temperature: 170° C.

In order to measure the thermal resistance a weight of 250 g/5 cm was suspended on the adhered textile strips. The specimens were suspended with the suspended weights in a forced-air oven heated at 1° C./min. The temperature at which the adhesion dissolved is designated as thermal stability.

TABLE 3

| Specimen | 1 | 3 | 10 | 11 |
|---|---|---|---|---|
| Original Adhesion (N/5cm) | 22 | 23 | 15 | 15 |
| Thermal stability (°C.) | 110 | 123 | 110 | 105 |

EXAMPLE 15

ISO tensile test bars and ISO beams for traction tests and impact tests were produced from the copolyether ester of example 1 by current injection molding methods. The measurements were carried out on pre-dried material according to ISO 527 (tensile test), ISO 179 (impact resistance) and DIN 53505 (Shore hardness).

| Tensile E-Modulus | [MPa] | 110 |
|---|---|---|
| Tensile strength at yield | [MPa] | 10 |
| Elongation at yield | [%] | 20 |
| Tensile strength at break | [MPa] | 15 |
| Elongation at break | [%] | >775 |
| Impact resistance Charpy New/23° C. | [kJ/m$^2$] | 30 |
| Impact resistance Charpy New/-30° C. | [kJ/m$^2$] | 70 |
| Shore hardness D | | 40 |

The elongation at break alone, which is no longer measurable, shows the exceedingly high flexibility of this material.

We claim:

1. Hot-melt masses consisting of a statistically built-up copolyether ester based on terephthalic acid and a mixture of aliphatic diols, characterized in that: terephthalic acid is used as the single acid component and its molar amount, relative to the total amount of acid, is 100 molar %; that a combination of butane diol, triethylene glycol and polyethylene glycol is present as diol component; that the molar amount of butane diol is less than 80 molar %, the amount of triethylene glycol is between 15 and 60 molar % and at least 2 and at the most 10 molar % of a higher-molecular polyethylene glycol component with a molar mass of 600–4000 g/mole is used, relative to the total acid amount and total diol amount of 100 molar % in each instance; and that the melting point of the copolyether ester adhesive masses is between 90° and 180° C.

2. Copolyether ester hot-melt masses according to claim 1, characterized in that the molar amount of butane diol is preferably between 45 and 70 molar % and the amount of triethylene glycol is between 20 and 50 molar %.

3. Copolyether ester hot-melt masses according to claim 1, characterized in that in order to raise the melting viscosity a tri- or polyvalent diol up to at the most 3 molar % relative to the total amount of diol can be used.

4. Copolyether ester hot-melt masses according to claim 1, characterized in that their melting point is between 110° C. and 170° C.

5. Copolyether ester hot-melt masses according to claim 1, characterized in that their melt viscosity, measured according to ISO/DIN 1133 (160° C./2.16 kg), is not below 200 Pa.s.

6. A hot-melt mass of a statistically built-up copolyether ester comprising:

a single acid component of 100 molar % terephthalic acid;

a diol compound comprising a combination of butane diol, triethylene glycol, and polyethylene glycol, said molar amount of butane diol is less than 80 molar %, said triethylene glycol is between 15 and 60 molar % and said polyethylene glycol has a high molecular weight with a molar mass of 600–4000 g/mole relative to said terephthalic acid and said diol components;

wherein said melting point of said copolyether ester is between 90° and 180° C.

7. The hot melt mass of claim 6 wherein said molar amount of butane diol is between about 45 and 70 molar %; said triethylene glycol is between about 20 and 50 molar % wherein said hot melt mass has a melting point between about 110° C. and 170° C. and a melt viscosity not below 200 Pa.s.

8. The hot melt mass according to claim 6 wherein said hot melt provides an adhesive in the form of a paste.

9. The hot-melt mass according to claim 1, wherein said hot-melt mass provides a powder coating.

10. The hot-melt mass according to claim 1, wherein said hot-melt mass provides an adhesive in the form of a paste.

11. Copolyether ester hot-melt masses according to claim 1, characterized in that their melt viscosity, measured according to ISO/DIN 1133 (160° C./2.16 kg), is not below 500 Pa.s.

* * * * *